Nov. 5, 1963    E. S. MESSER    3,109,294
STORAGE TANK AND LIQUID FLOW CONTROL MEANS
Filed March 21, 1961    7 Sheets-Sheet 1

INVENTOR.
Elmer S. Messer
BY
Ooms, McDougall, Williams & Hersh
Attorneys

INVENTOR.
Elmer S. Messer
BY
Ooms, McDougall, Williams & Hersh
Attorneys

INVENTOR.
Elmer S. Messer

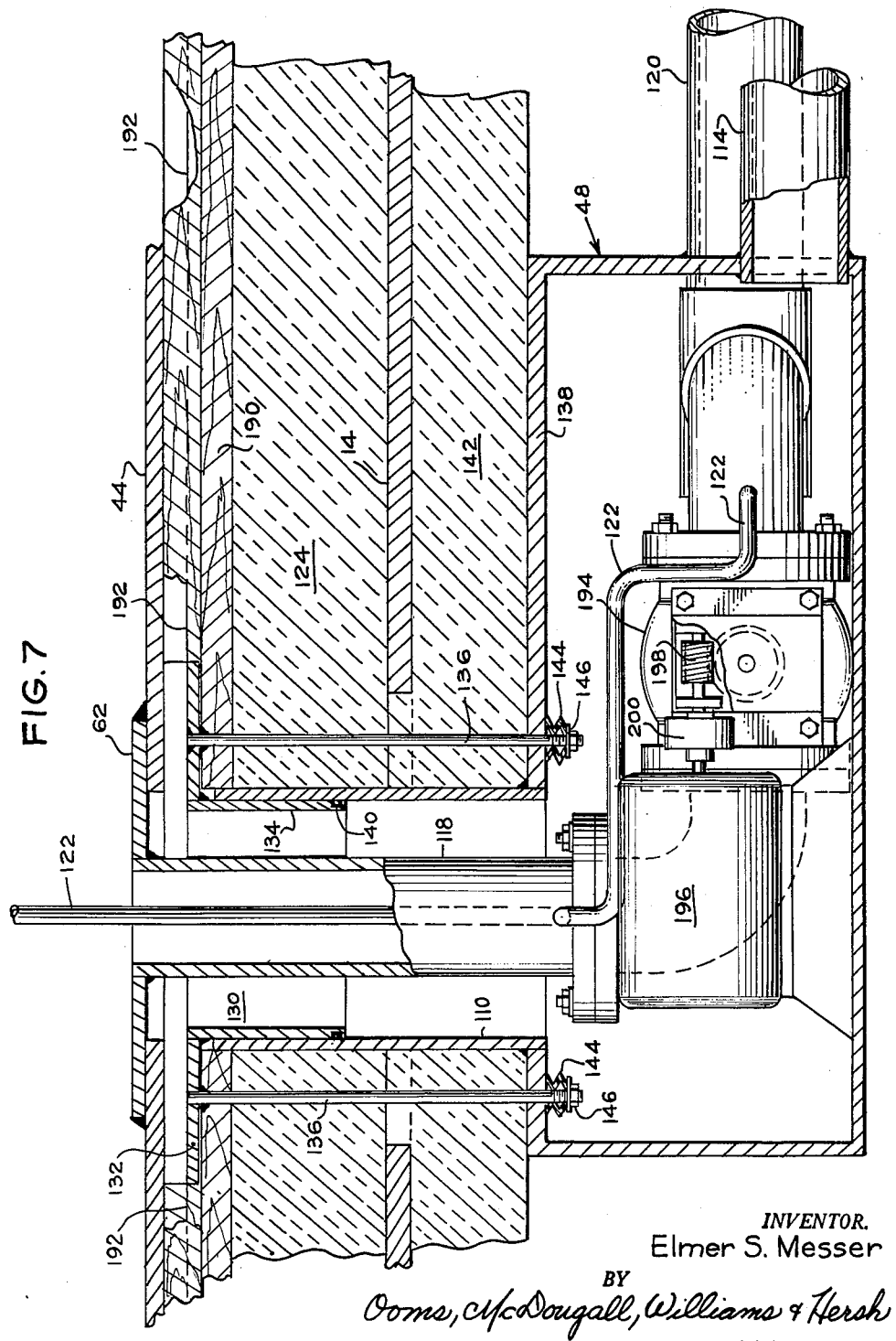

Nov. 5, 1963     E. S. MESSER     3,109,294
STORAGE TANK AND LIQUID FLOW CONTROL MEANS
Filed March 21, 1961     7 Sheets-Sheet 6

INVENTOR.
Elmer S. Messer
BY Ooms, McDougall,
Williams & Hersh
Attorneys

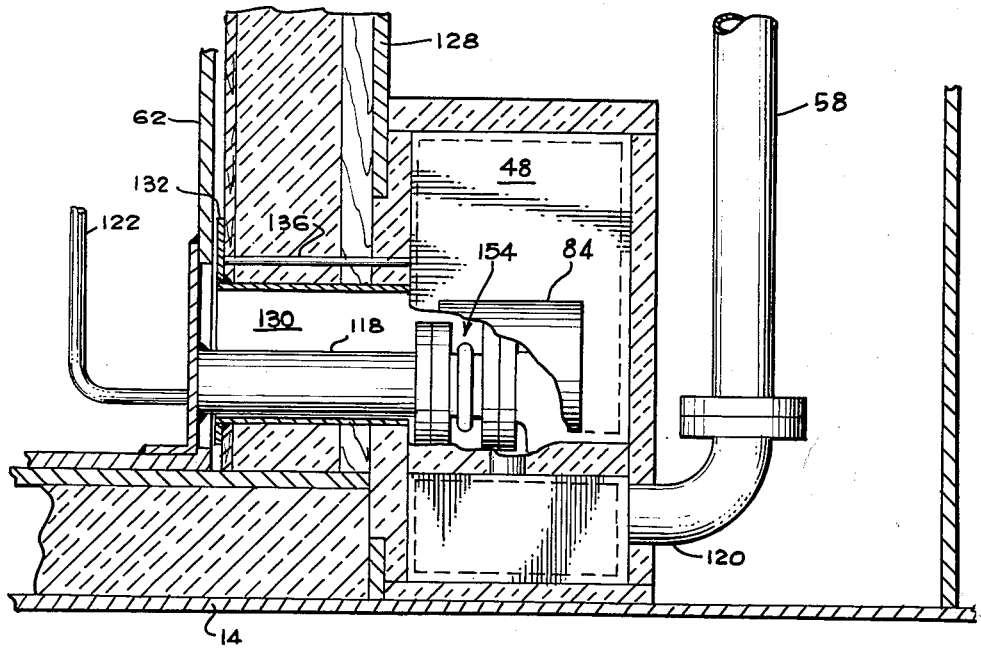
FIG. 12
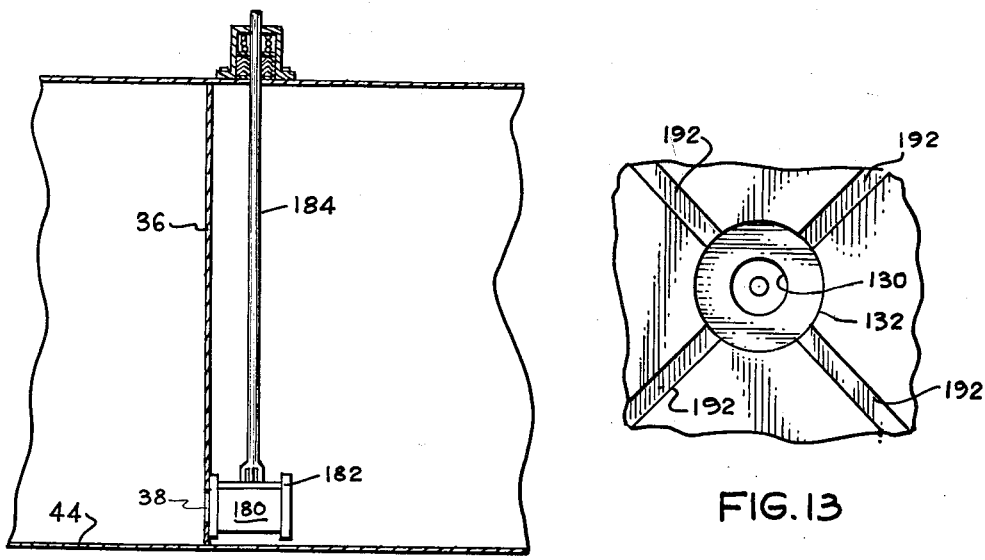
FIG. 14
FIG. 13
INVENTOR.
Elmer S. Messer
Attorneys

United States Patent Office 3,109,294
Patented Nov. 5, 1963

3,109,294
STORAGE TANK AND LIQUID FLOW
CONTROL MEANS
Elmer S. Messer, Tulsa, Okla., assignor to Conch International Methane Limited, Nassau, Bahamas, a corporation of the Bahamas
Filed Mar. 21, 1961, Ser. No. 97,325
20 Claims. (Cl. 62—55)

This invention relates to the displacement of a cold liquid into and out of a storage facility of large capacity and it relates more particularly to a method and means for filling and for emptying deep well tanks of large capacity housed within an insulated hold space of a ship for transportation of the cold liquid from a source of plentiful supply to an area where a deficiency exists.

The invention will be described with reference to the storage and transportation of natural gas in a liquefied state from a source of plentiful supply of natural gas to an area where a deficiency of natural gas exists. Storage and transportation is effected in tanks of large capacity wherein the liquefied gas is stored at about atmospheric pressure or at a temperature substantially less than $-200°$ F. and usually within the range of $-240°$ F. to $-258°$ F., depending upon the amount of heavier hydrocarbons present in combination with the principal component of methane, which boils at $-258°$ F. at atmospheric pressure. It will be understood that the concepts of this invention will have application also to the storage and transportation of other cold liquids and liquefied gases, such as liquefied nitrogen, oxygen, air, or the like.

In one method and means which has been developed and placed into commercial operation, each storage tank is provided with a displacement pump located in the bottom of the tank for operation by a driving means located outside of the tank, on the upper end, where access can be had for replacement or repair of the driving means. The driving means is connected to the pump for operation by an elongate shaft which extends downwardly through the length of the tank within a tubular housing through which the liquid is displaced. In practice, it has been found that the elongate shaft and housing are sometimes subject to binding because of distortions under load or temperature change or because of solidification of foreign material therebetween with the result that interferences develop in the operation of the pump for the removal of liquid.

Another method and means which has more recently been developed avoids the wide separation between the pumping means and the power means by submerging both the pump and power operated driving means in the bottom end portion of the tank for use in displacement of liquid through an outlet pipe which extends upwardly through the tank from the pump outlet to a collection pipe which leads to a shore installation. While this technique eliminates the long drive shaft and displacement member, it still calls for a separate pumping and drive means for each tank to be submerged within the cold liquid and for raising the liquid to a point above the deck for transmission to a shore installation.

It is an object of this invention to provide a new and improved method and means for the displacement of liquid into and out of a tank or tanks.

More specifically, it is an object of this invention to provide a method and means for the displacement of cold liquid not only to effect removal from a tank or tanks but also to effect the introduction of said liquid for filling the tank; which avoids submergence of the pumping means or driving means within the cold liquid in the tank; which enables location of the pumping means and driving means outside of the tank where they can be made readily accessible for replacement or repair; which enables location of the pumping and driving means separate and apart from the transportation means in which the tanks are located; which enables the use of a pumping means for servicing one or a plurality of tanks thereby materially to reduce the cost of equipment and installation; which enables liquid flow into and out of the tanks to be achieved without raising the liquid above the deck of the ship thereby markedly to increase the safety of operation without correspondingly increasing the cost; which enables selectivity in liquid flow into and out of the individual tanks thereby to control the introduction or removal of liquid; which permits the inclusion of additional safety features for the collection of liquid inadvertently escaping from the tank for the safe disposal thereof or for the recovery thereof; in which the operation for filling or emptying the tank with cold liquid is not subject to interferences because of failure of pumping means, and which materially increases the safety and efficiency of operation for filling and emptying the ship's tanks.

These and other objects and advantages of this invention will hereinafter appear and for purposes of illustration, but not of limitation, embodiments of the invention are shown in the accompanying drawings, in which—

FIGS. 7 and 8 are fragmentary sectional elevational views of the arrangement of elements in the bottom discharge from the tank;

FIG. 12 is a sectional elevational view similar to that of FIG. 10 showing a modification in the arrangement of elements for side discharge;

FIG. 13 is a top plan view showing the construction in the insulated flooring in the assembly shown in FIG. 7, and FIG. 14 is a fragmentary sectional elevational view of a port blocking means employed between swash plates within the tanks.

Figure 1:
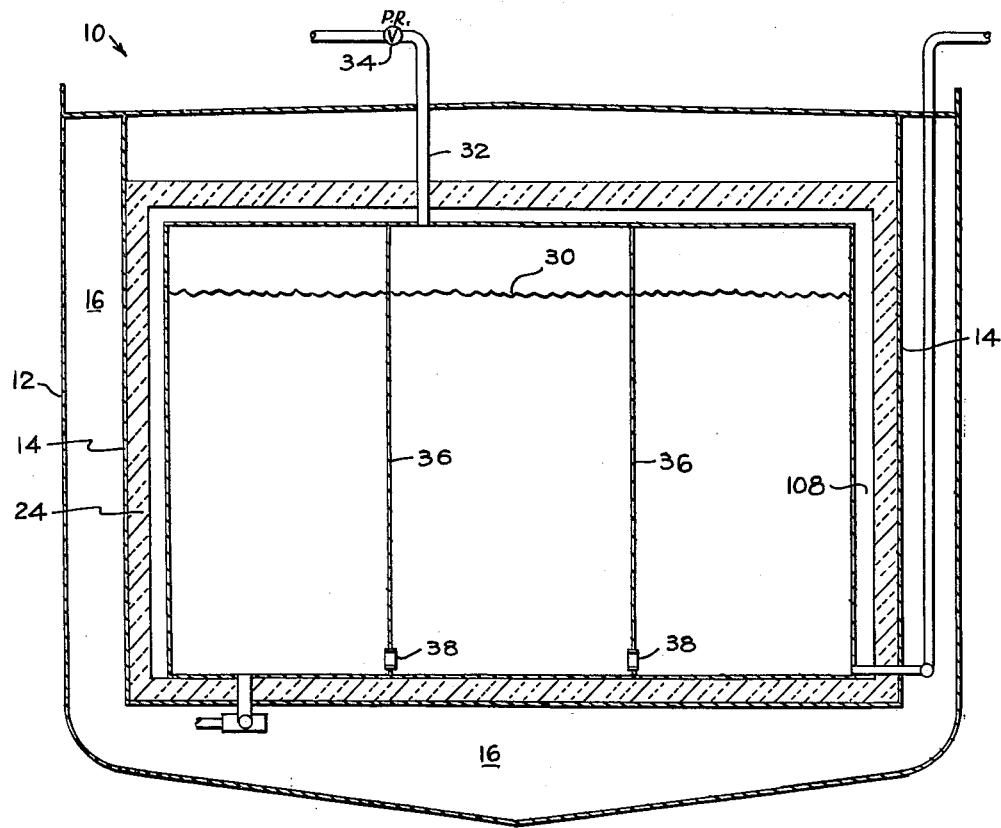
FIG. 1 is a schematic sectional elevational view crosswise of a ship embodying the features of this invention.

Referring now to the drawings, illustration is made of a ship 10 formed with an outer hull 12 and an inner hull 14 spaced a short distance inwardly from the outer hull to provide a ballast area 16 in the form of wing tanks in between and through which water may be circulated for temperature control to protect the outer hull from the cold of the cargo liquid or to provide ballast for the ship. The ship is also constructed with one or more bulkhead areas 18 formed of closely spaced apart walls 20 and 22 extending crosswise of the ship to subdivide the ship lengthwise into a plurality of separated compartments. The inner surfaces of the inner hull and the inner surfaces of the bulkhead walls are provided with a relatively thick layer 24 of thermal insulating material to define an insulated hold space 26 in which one or more tanks 28 of large capacity are mounted for housing the cold cargo liquid 30. Each tank is provided with a vent 32 having a pressure relief valve 34, schematically illustrated in FIGS. 1 and 2 of the drawings, for the release of vapors when pressures exceed a predetermined value in the tank or tanks.

The insulated hold space 26 may be occupied by one or more tanks 28 in various arrangements, schematically illustrated in FIG. 1 as a tank having a width corresponding to the width of the hold space with a pair of swash plates 36 dividing the tank into separated sections with ports 38 providing communication therebetween. Similarly, the insulated hold space may be provided with a tank having a length corresponding to the length of the hold space, as illustrated in FIG. 2, with or without subdividing swash plates or with more than one separated tank in side-by-side relationship within the hold space.

Figure 5:
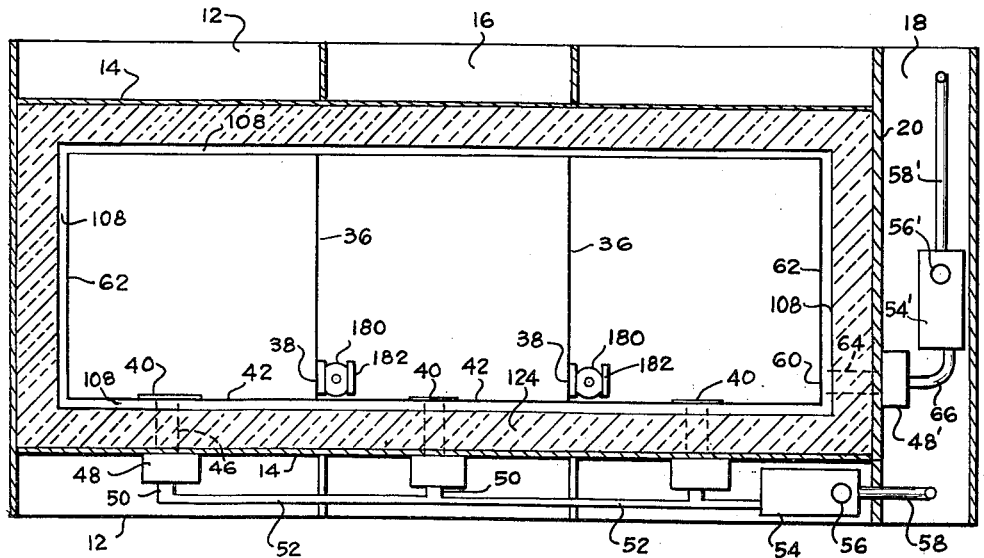
FIG. 5 is a schematic sectional elevational view in horizontal cross-section of the ship shown in FIGS. 1 and 2 showing the arrangement of elements for sidewise discharge into the ballast portion of the ship in the lower portion of FIG. 5 and for sidewise discharge of the liquid into the bulk head area of the ship, in the portion to the right in FIG. 5.

The concepts of this invention reside primarily in the construction wherein the pumping means and drive are located outside of the tanks with entry for the introduction and removal of liquid occurring through a bottom port into the tanks with valve means for controlling the flow of liquid through said ports into and out of the tanks. The concepts described are capable of various ramifications. As illustrated in FIGS. 1 and 5, the elements can be arranged for passage of the liquid through the ballast area 16 by construction of the tanks with ports 40 in the bottom walls 42 of the tank for transmission of liquid through passage 46 to and from a sump chamber 48 provided with a valve, hereinafter described, for control of the passage of the liquid through the passage 50 into or out of the header 52 communicating each of the tank ports with the pump sump 54 having a pumping means 56 for displacement of the liquid through the riser 58 adapted to be connected to a shore installation.

Figure 2:
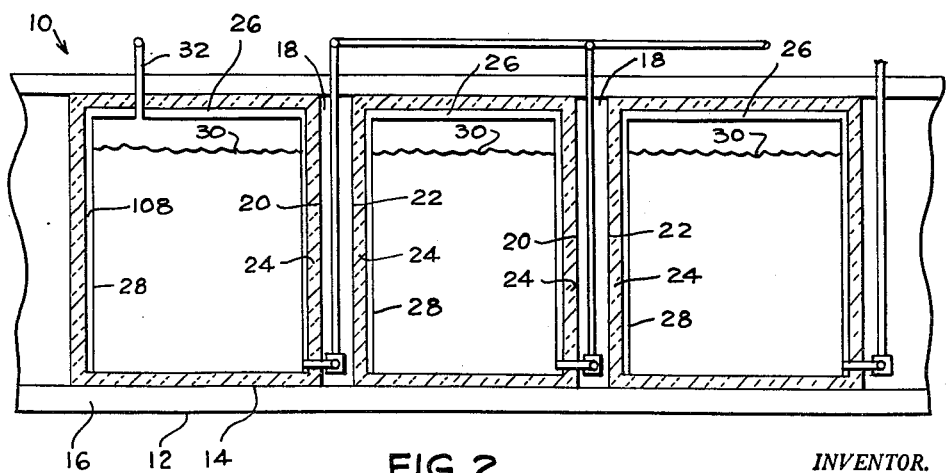
FIG. 2 is a sectional elevational view taken lengthwise of the ship to show the tank and bulk head arrangements within the ship.
Figure 11:
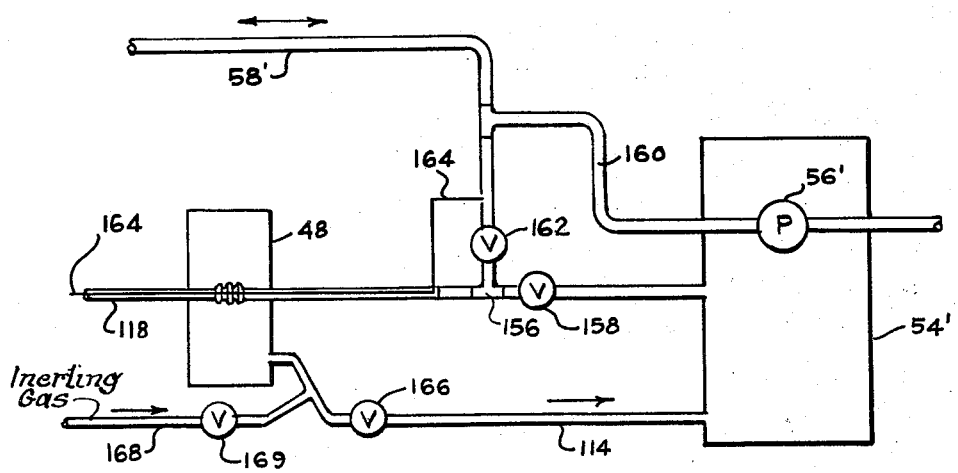
FIG. 11 is a flow diagram illustrating the arrangement of elements in the construction shown in FIG. 10.
Figure 10:
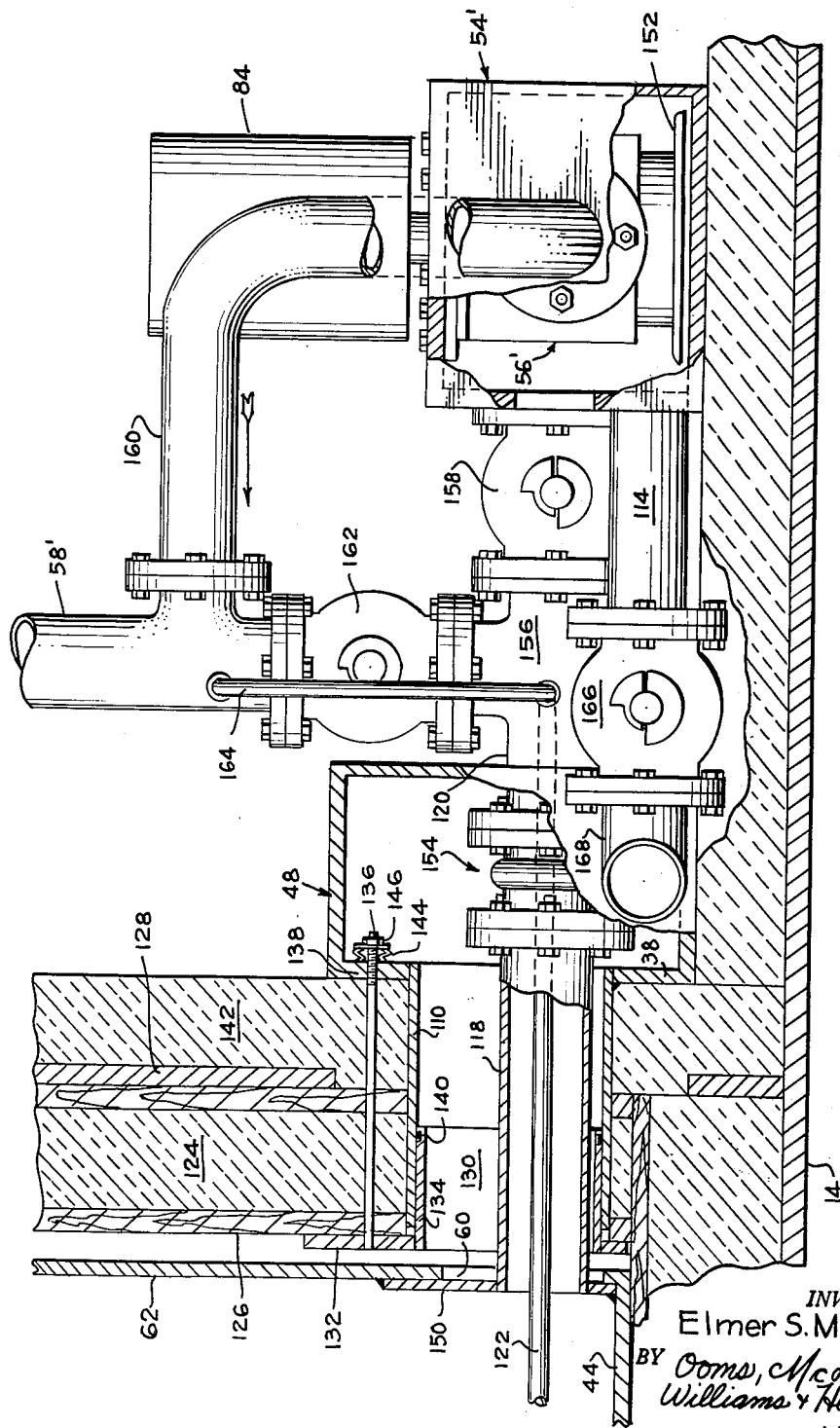
FIG. 10 is a sectional elevational view of a fragmentary portion of the construction showing the arrangement of elements for side discharge into the bulkhead area.

As further illustrated in FIG. 2 and the portion to the right in FIG. 5, the elements can be arranged for discharge of the liquid through the bulkhead space 18 by construction of the tanks with a port 60 in the end wall 62 adjacent the bulkhead wall 20 with a piping 64 communicating the port 60 with the sump chamber 48' which communicates through the passage 66 with pump sump 54' having a pump 56' for the displacement of liquid therefrom into the riser 58' all of which can be located in the bulkhead area, as illustrated more specifically in FIGS. 10 and 11. When the arrangement for bulkhead discharge is employed, it is desirable to provide access openings or ports 38 in the bottom portions of the swash bulkheads 36 for communicating the tank or tank sections one with the others to drain or introduce liquid in filling or emptying the tanks through the port 60. The ports 38 are adapted separately to be controlled for opening and closing the ports to effect communication between the tank sections by blocking means such as the type shown in FIG. 14, adapted to be externally controlled for displacement between open and closed positions.

Figure 3:
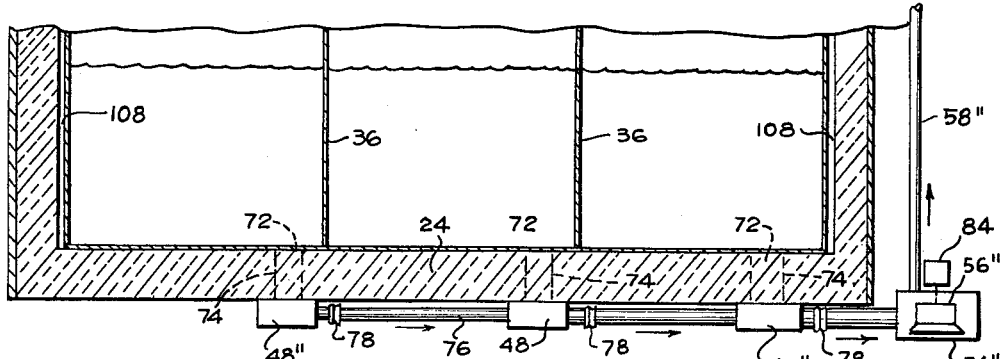
FIGS. 3 and 4 are schematic sectional elevational views of a portion of the ship structure shown in FIGS. 1 and 2 showing the arrangement of elements for bottom discharge of the liquid from the tanks into the keel area of the ship.
Figure 4:
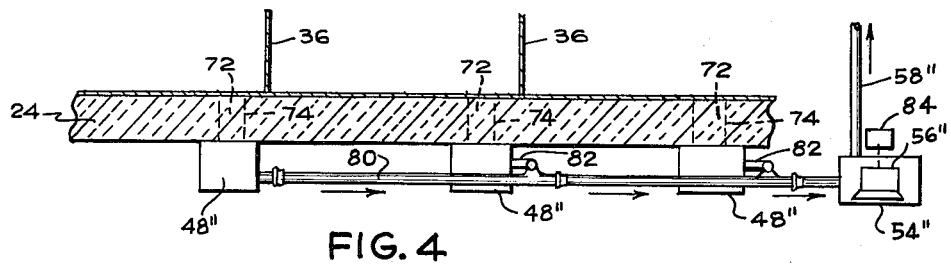

As still further illustrated in FIGS. 1, 3 and 4, the elements can be arranged for bottom discharge through the bottom walls of the tanks through the insulation 24 into the keel area of the ship for passage of the liquid through piping arranged in the keel area to the shore connecting facilities. For this purpose, the tanks are provided with ports 72 in the bottom walls for communication with sump chambers 48" through passages 74. In FIG. 3, each pump housing is connected in series whereby the piping 76 communicates one sump chamber with the next with expansion members 78 therebetween. In FIG. 4, each sump chamber 48" is connected in parallel with each pump sump 54" with each sump housing 48" being separately connected to the header 80 through branch passages 82 for communication with the sump housing 54" having a pump 56" fitted with a motor drive 84 for displacement of liquid from the sump housing into the riser 58". The riser, which communicates the pump sump with the shore connection, can be constructed to pass upwardly through the ballast area 16 or through the bulkhead space 18 of the ship.

Having briefly described the various possible arrangements with bottom entry into the tank or tanks or with side entry into the tank or tanks, description will now be made more specifically with respect to the entry into the tanks and the construction and attachment of the flow control means and sump chambers in communication therewith.

By way of generalization, the elements hereinafter described which come into direct contact with the cold liquid are formed of temperature-insensitive materials which do not experience excessive losses in strength or ductility at the cold temperature of the liquid. Such materials may be suitably selected of aluminum or alloys of aluminum, stainless or the like high nickel or austenitic steels, copper, brass or some plastics, such as polytetrafluoroethylene, etc.

Figure 6:
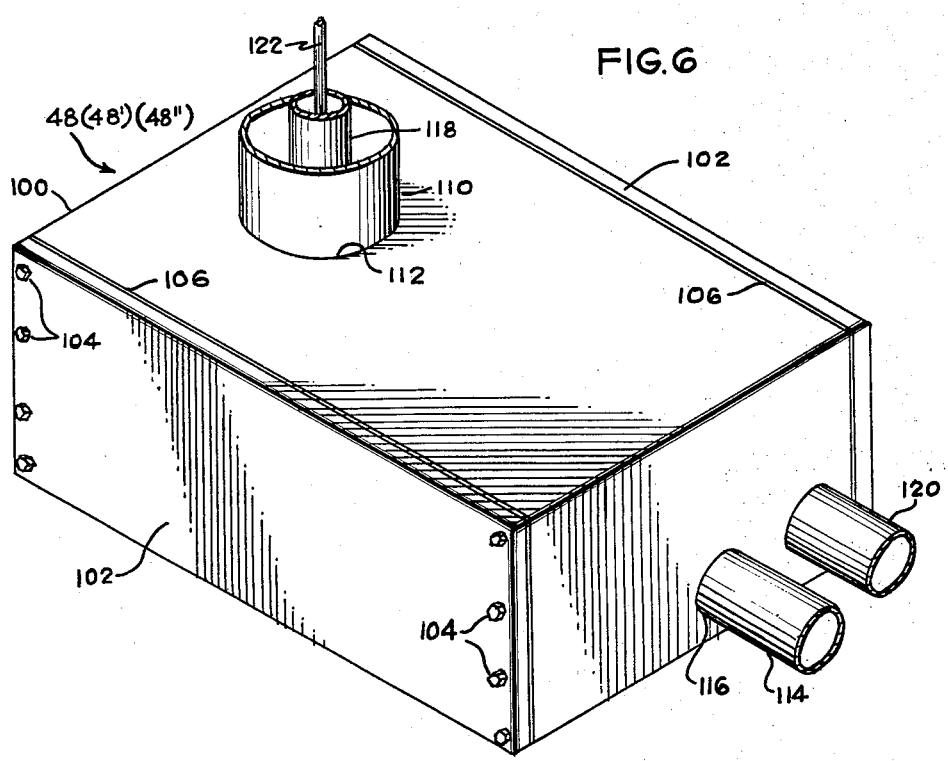
FIG. 6 is a perspective elevational view partially in section of a sump chamber employed in the practice of this invention.

The sump chamber hereinafter defined by the numeral 48 and which includes 48' and 48", as illustrated in FIG. 6, is a rectangularly shaped casting 100 of aluminum having open sides which are adapted to be closed by cast metal side plates 102 secured as by bolts 104 to the edges of the casting 100 with a sealing gasket 106 of nylon or the like in between. Liquid escaping from the tank into what will hereinafter be referred to as the insulation area 108 is drained into the sump chamber 48 through a drain pipe 110 of large diameter which communicates the inner face of the insulation with an inlet opening 112 in the adjacent wall of the sump chamber. Liquid is discharged from the sump chamber into a sump drain 114 in communication with a discharge opening 116 in another wall of the chamber 48. Concentrically arranged to extend through the drain pipe 110 is a pipe section 118 which communicates with the ports 72 in bottom delivery or ports 40 or 60 in side delivery in the liquid storage tanks 28. The pipe section 118 communicates with the pipe 120, corresponding to the pipe sections 50 or 66 in FIG. 5 or pipe sections 76 or 82 in FIGS. 3 and 4, which extends from the other wall of the sump chamber. Also concentrically arranged within the pipe section 118 is a still further pipe member 122 of small diameter which extends upwardly into the tank for connection with one-way flow spray heads or nozzles (not shown) mounted within the tank for the purpose of spraying liquid at a slow rate into the tank to cool down the tank before introduction of liquid at high rate for filling through the pipe section 118.

The arrangement of elements housed within the sump chamber 48 for control of liquid flow will depend somewhat on the location of the port in the tank and the degree of automation desired for operation and control of fluid flow. However, attachment of the sump chambers to the tanks for operation will be substantially the same whether arranged for side discharge into the ballast area or bulkhead area or for bottom discharge through the floor of the tank into the keel area.

Referring to FIGS. 10 and 11, the numeral 62 illustrates the side wall of the tank having a port 60 in the portion adjacent the bottom wall 44. The numeral 124 indicates the insulation layer having a hardwood facing 126 and the numeral 128 indicates the inner hull when the discharge is into the ballast area or the bulkhead wall when the discharge is into the bulkhead area. Both the wall 128 and the insulation layer 124 are provided with an opening 130 of larger dimension than the drain pipe 110 and in alignment with the port 60 or 40 in the tank.

A disc plate 132 having a tubular section 134 extending outwardly therefrom is secured in position against the inner face of the insulation layer with the tubular portion 134 extending into the opening 130 by means of a plurality of elongate studs 136 which extend through aligned openings in the insulation for passage through openings in the adjacent wall 138 of the sump chamber 48. When the sump chamber is placed into position of use against the outer wall of the insulation layer the drain pipe 110 extends into the opening 130 for a distance to telescope with the tubular section 134 of the disc plate 132. Sealing engagement is established between the telescoped sections, as by means of a Teflon O-ring 140 to form a continuous passage from the inner face of the insulation section 108 to the interior of the sump chamber 48 for the drainage of liquid escaping from the tanks into the insulation section. The elements are held in the assembled relationship with the disc plate 132 firmly engaged with the hardwood surface 126 of the insulation layer and with the wall 138 of the sump chamber 48 engaging the adjacent insulation layer 142 of hardwood by resilient means, such as Bellville washers 144 positioned about the through-extending portion of the studs 136 between the nut member 146 and the inner surface of the chamber wall 138. The additional insulation layer 142 arranged between the sump chamber and the wall 128 serves to protect the ship structure from the cold of the liquid within the sump chamber.

After the tank has been installed, the pipe section 118 formed with an annular flange 150 on the inner end thereof is welded to the tank wall 62 about the port 60 or 40 so that the pipe section 118 and the spray pipe 122 extend lengthwise through the opening 130 lined by the tubular members 134 and 110 to the sump chamber. The remainder of the piping and connections and controls can be installed after the described assembly has been effected since access can be had through the side opening of the sump chamber and the space outwardly thereof for attachment.

In the arrangement for side discharge into the bulkhead area, a centrifugal pump 56' having a motor drive 84 is mounted to depend from the top side of the pump sump 54' with the bell 152 of the pump adjacent the bottom wall of the sump. The methane passes from the pipe section 118 through expansion bellows 154, located within the sump chamber 48, to the outlet pipe section 120. From the outlet, the liquid passes through a T 156 through a control valve 158 into the pump sump 54'. The pump 56' discharges the liquid from the pump sump through the discharge line 160 into the riser 58' through which the liquid is raised to the header on the ship for shore attachment. The elements described including the control valve 158, the pump sump 54', the line 160 and riser 58' and the sump chamber 48 are all located within the bulkhead space where easy access can be had for repair or replacement of parts or for operation of the control valve 158 unless power operated or in the event that power operation fails. It has been found that only slight pressure within the tank will be sufficient to ensure a continuous supply of liquid to the pump inlet for efficient operation in removal of liquid. When the port 60 or 40 is also used for filling the tank, the riser 58' communicates with the T section 156 through another flow control valve 162 capable of manual or mechanical operation for adjustment between open and closed positions. The valve 162 is by-passed by a spray line 164 which communicates at one end with the riser and enters the T for passage concentrically through the pipe section 118 into the tank to the spray heads. In operation to fill the tank, both the flow control valves 158 and 162 are closed so that liquid under pressure will flow through the spray lines 164 and 122 to the spray heads for cool-down of the tanks. When the tanks are cooled, the flow control valve 162 is opened so that liquid can flow at full rate through the main line 118 into the tank.

The sump chamber can be used to effect removal of liquid escaping into the insulation area in the event of leakage of the tank or tanks or it can be used for inerting the insulation area about the tanks. For the former, the sump chamber 48 communicates with the sump pump 54' through the passage 114 which is fitted with a flow control valve 166. Instead of returning the liquid drained from the insulation into the pump sump 54' for recovery or for removal, the passage 114 may be otherwise arranged to dispose of the drained liquid as by release over the side or from the rear of the ship.

For inerting, a source of inert gas, such as nitrogen, may be admitted into the sump chamber 48 through a connecting pipe 168 with a flow control valve 169 in between. In review, when discharging the tank, valve 162, valve 166 and the nitrogen inerting valve will be closed while valve 158 will be open for flow of liquid from the tank through the pipe section 118 to the pump sump 54' and from the insulation section through the sump chamber 48 and line 114 into the pump sump 54'. When filled, valves 162 and 158 will be closed and the remainder will be left open until the tank is cooled down after which valve 162 will also be opened for full flow of liquid from the riser 58' into the T 156 and through pipe section 118 into the tank. It will be apparent that any liquid escaping to the outside of the tank will drain into the sump chamber 48 through the annular space 130 which communicates the insulation space with the sump chamber. By the same path, inerting gas can be introduced into the sump chamber from the nitrogen source through line 168 for flow through the annular space 130 into the insulation area for inerting.

When more than one tank is aligned between bulk heads, or when the tank is subdivided into separate sections, as by swash plates, as illustrated in FIG. 5, it is desirable to communicate one tank section with the other for the passage of liquid from one tank section to the other either in filling or in an emptying operation. When such connecting ports or passages are employed between tank sections, it is desirable to provide means for opening and closing said ports or passages. One such means, illustrated in FIG. 14, comprises a gate valve 180 shiftable vertically between guides 182 between positions blocking and unblocking the port 38 or passage, as by means of a shaft 184 which extends vertically through the tank and through a sealed opening in the top wall for external operation. It will be understood that instead of a gate valve, use can be made of other valve means such as a Flo-Ball valve of conventional construction and the like.

The construction for lateral flow from the sides of the tanks into the ballast area can be somewhat the same as for the described flow into the bulkhead area, except that greater mechanization may be desired for automatic power operation of the flow control valves in the light of the lesser space available for access. Under such circumstances, an electrical or fluid motor may be used instead of manual means to effect the desired operation of the valve members.

The construction for bottom discharge into the keel area of the ship can be the same as that for side discharge into the ballast or into the bulkhead area but it is desirable to effect certain modifications for mechanical operation of the flow control valves in the light of the greater difficulty in gaining access to the valves for other means of operation in the event of failure. Thus, in describing the discharge to the bottom of the tank, certain modifications in construction and arrangement of elements will be made, it being understood that such modifications are capable also of adaptation in the previously described techniques for side discharge.

Figure 8:
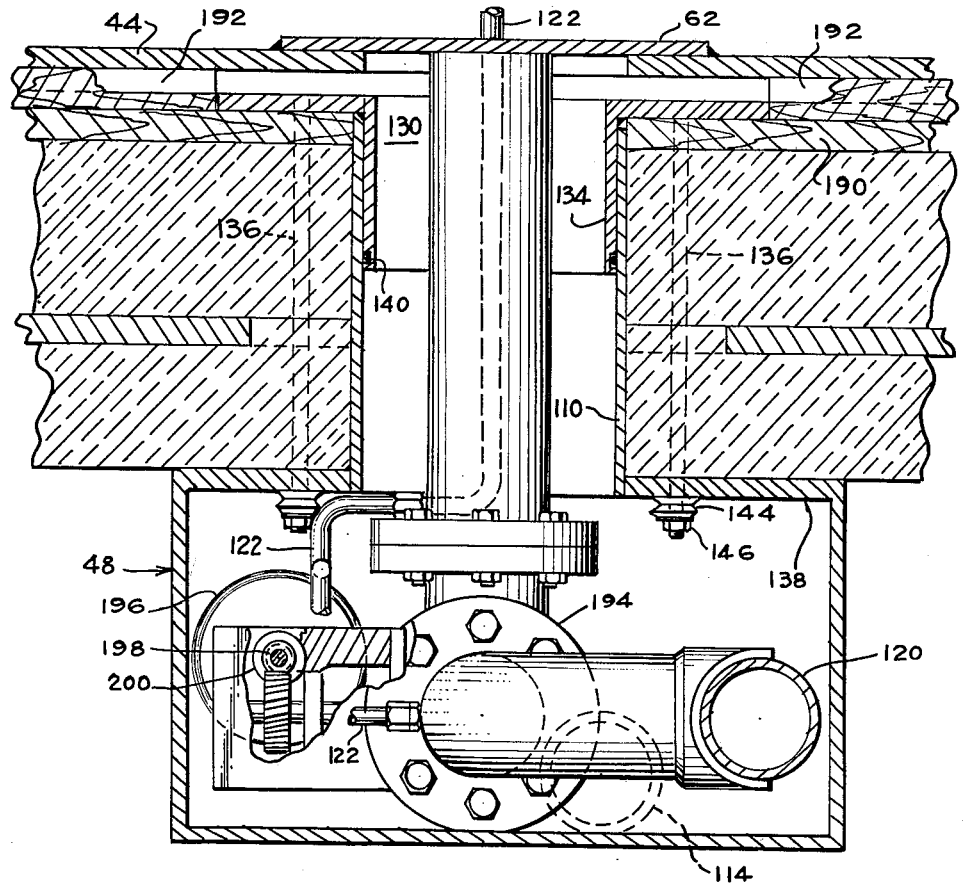

In the modification shown in FIGS. 7 and 8, the sump chamber 48 is similarly constructed for attachment to the bottom side 44 of the tank with the inner hull 14 in between. However, since the bottom wall of the tank rests upon the hardwood surface 190 of the insulation, it is desirable to provide channels 192 (see FIG. 13) in the surface of the insulation flooring with the channels radiating outwardly or otherwise in communication with the opening 130 to provide troughs through which liquid can flow from the insulation space beyond the tank to the insulation drain opening 130 and into the sump chamber 48 for recovery or for removal.

By way of another modification, the flow control valve 194 for the main liquid lines 118 and 120 is located within the sump chamber 48 for operation as by a contained motor 196, such as an electrical or hydraulic motor. In the modification illustrated in FIGS. 7 and 8, the valve 194 is in the form of a Flo-Ball valve operated by the electrical motor 196 through a gear reducer 198 in the form of a worm and a slip clutch 200.

Figure 9:
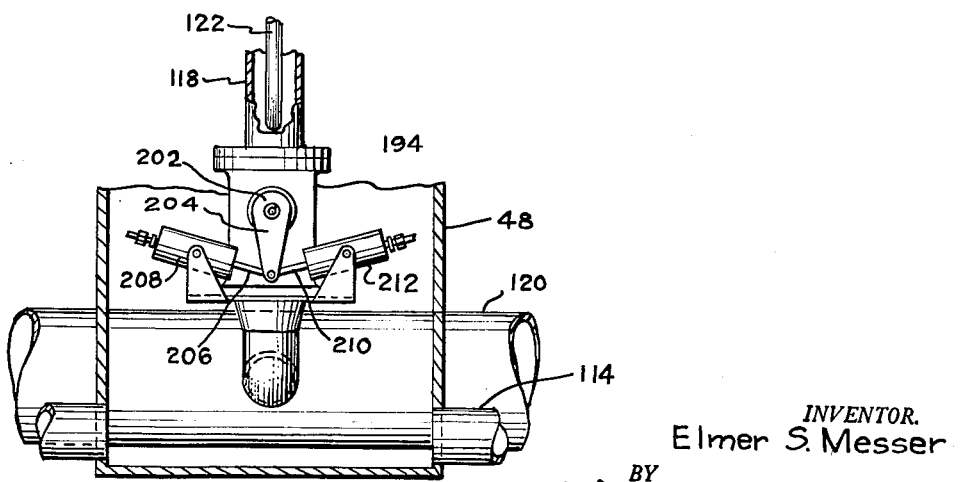
FIG. 9 is a fragmentary elevational sectional view similar to that of FIG. 7 showing a modification in the valve means for controlling the flow of liquid.

In FIG. 9, the flow control valve is in the form of a butterfly valve 202 having an arm 204 depending outside of the housing with the end portion pivotally engaged by the rod 206 of one hydraulic motor 208 for rocking movement of the arm 204 and valve in one direction to closed position and by another rod 210 and pivotally mounted hydraulic motor 212 for rocking movement in the other direction to opened position. The spray line 122 by-passes the flow control valve in each instance for introduction of pressurized liquid to the spray heads of the tank while the flow control valves are closed and liquid is allowed to pass at higher rate into and out of the tank through the main liquid lines 118 and 120 when the flow control valves are opened. Drainage into the sump chamber from the insulated space can be discharged through line 114 to the pump sump, if employed, or to a discharge from beyond the ship. Inerting can be carried out in the described simplifications for liquid flow, as set forth in FIGS. 7, 8 and 9, by connecting the inerting line 168 with the discharge line 114 from the sump chamber.

It will be apparent that various modifications are possible for handling the liquid flow to and from the tank or tanks. While description has been made of the use of a pump sump having a pump mounted therein for the displacement of liquid therefrom, it will be apparent that the fluid from the charging and discharging line may lead directly to a pump for displacement of liquid into and out of the tank.

By way of still further modification, instead of locating the pump or pumps in or on the ship, or between the bulkheads in the ship, the concepts of this invention include the complete elimination of pumping equipment on the ship when use is made of a flexible piping or pivotal piping on the ship for connection with pumping equipment on shore whereby liquid is withdrawn or introduced into the line communicating with the flow control valves for the regulation of liquid flow to or from one or the other of the tanks in the ship, as illustrated by FIG. 10 of the drawings.

It will be understood that various other changes may be made in the details of construction, arrangement and operation within the concepts broadly defined in the specification, without departing from the spirit of the invention, especially as defined in the following claims.

I claim:

1. In the storage and transportation of a cold liquid in tanks of large capacity mounted within an insulated space, a sump chamber having an inlet in one wall and a first and second outlet in another wall, an outlet opening in one wall of the tank, a tubular member extending from the inlet opening in the sump chamber to the insulation space about the tank for passage of liquid from the insulation space into the sump chamber, another tubular member of smaller dimension than the first extending therethrough from the tank outlet into the sump chamber, means communicating the other tubular member with the first outlet in the sump chamber whereby liquid to and from the tank passes through said first outlet and liquid from the insulation space passes into said chamber to the second outlet, a pumping means, a liquid header, means communicating said first outlet in the sump chamber with said pumping means, means communicating said pumping means with the liquid header, and a flow control valve interposed between said pumping means and the outlet opening in the tank.

2. A structure as claimed in claim 1 in which the liquid is liquefied natural gas.

3. A structure as claimed in claim 1 in which the outlet opening is in the bottom wall of the tank.

4. A structure as claimed in claim 1 in which the outlet opening is in a side wall of the tank adjacent the bottom wall.

5. A structure as claimed in claim 1 in which the outlet opening is in a bottom wall portion of the tank and the sump chamber is positioned outwardly from the tank wall in alignment with the outlet opening and with the insulation inbetween, and means for securing the sump chamber to the insulation for support.

6. A structure as claimed in claim 5 in which the securing means comprises a flanged pipe section positioned on the side of the insulation adjacent the tank wall and having a drain opening therein through which the pipe of the pipe section extends and in which the pipe section is dimensioned to telescope with the tubular member of the sump chamber, studs fixed on one end to the flanged portion of the pipe section and extending outwardly through the insulation and through aligned openings in an adjacent wall of the sump chamber, and means on the through-extending portion of the studs constantly urging the sump chamber wall in the direction towards the flanged portion of the pipe to grip the insulation therebetween.

7. A structure as claimed in claim 6 which includes a sealing ring between the telescoped portions of the tubular member and the pipe section to effect a sealing relationship therebetween.

8. A structure as claimed in claim 6 in which the surface of the insulation is grooved from the opening outwardly to enable flow of liquid from the insulation space to the drain opening.

9. A structure as claimed in claim 1 in which the tank has a plurality of spray heads for cool-down and which includes a spray pipe arranged within the other tubular member for passage therethrough and through the outlet opening into the tank to the spray heads, and means communicating the spray pipe with the pumping means and bypassing the flow control valve.

10. A structure as claimed in claim 1 which includes means communicating the second outlet from the sump pump with a disposal area for disposal of liquid drained into the sump chamber from the insulation area.

11. A structure as claimed in claim 1 which includes means communicating the second outlet from the sump chamber with the pumping means for recovery of liquid drained from the insulation.

12. A structure as claimed in claim 11 which includes a valve within the means communicating the second outlet from the sump chamber with the pumping means for the control of the flow of liquid therethrough.

13. A structure as claimed in claim 1 which includes a source of inert gas and means communicating said source of inert gas with the sump chamber for inerting the insulation space.

14. A structure as claimed in claim 13 which includes a flow control valve between the source of inert gas and the sump chamber for the control of the flow of inert gas to the sump chamber.

15. A structure as claimed in claim 1 in which a plurality of tank sections are arranged one adjacent the other, and which includes means communicating the sump chambers for each of the tank sections in series to a common pumping means, and in which flow control valves are provided between the pumping means and each of the other tubular members communicating with the tank outlets of each of the tank sections.

16. A structure as claimed in claim 1 in which a plurality of tank sections are arranged one adjacent the other and which includes means communicating the sump chambers in parallel with a header and pumping means common to the sump chambers and means communicating the header with each of the other tubular members leading to the tank outlets, and a flow control valve between the header and each of said tank outlets.

17. A structure as claimed in claim 16 which includes an expansion means in each of said other tubular members between the tank outlet and the first outlet from the sump chamber.

18. A structure as claimed in claim 1 in which the flow control valve is located within the sump chamber between the first outlet and the inlet.

19. A structure as claimed in claim 18 which includes power means remotely controlled for operation of the flow control valve between open and closed positions.

20. A structure as claimed in claim 1 which includes splash plates subdividing the tank into aligned adjacent tank sections, ports in the base of the splash plates communicating the tank sections one with another, means shiftable into and out of port-opening and closing positions, means external of the tank for controlling said port-opening and closing means and in which the tank is formed with a single outlet through which liquid flows for filling and discharging the tank sections.

References Cited in the file of this patent

UNITED STATES PATENTS

| | | |
|---|---|---|
| 1,410,287 | Ebsen | Mar. 21, 1922 |
| 2,346,505 | Preuss | Apr. 11, 1944 |
| 2,480,472 | Jackson | Aug. 30, 1949 |
| 2,512,308 | Cooper | June 20, 1950 |